US007478145B2

(12) United States Patent
Braun et al.

(10) Patent No.: US 7,478,145 B2
(45) Date of Patent: Jan. 13, 2009

(54) SYSTEM AND METHOD FOR ANALYZING A NETWORK AND/OR GENERATING THE TOPOLOGY OF A NETWORK

(75) Inventors: Josef Braun, Konnersreuth (DE); Joachim Feld, Nürnberg (DE); Stefan Roth, Altdorf (DE); Thomas Talanis, Heroldsbach (DE); Thomas Tröster, Dittenheim (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 10/503,757

(22) PCT Filed: Jan. 24, 2003

(86) PCT No.: PCT/DE03/00199

§ 371 (c)(1),
(2), (4) Date: Apr. 13, 2005

(87) PCT Pub. No.: WO03/067853

PCT Pub. Date: Aug. 14, 2003

(65) Prior Publication Data

US 2005/0226167 A1 Oct. 13, 2005

(30) Foreign Application Priority Data

Feb. 6, 2002 (DE) ................................ 102 04 826

(51) Int. Cl.
*G06F 15/173* (2006.01)
*G06F 15/16* (2006.01)
*G06F 7/00* (2006.01)
*H04L 12/28* (2006.01)

(52) U.S. Cl. ....................... 709/220; 709/224; 709/238; 709/248; 709/249; 709/252; 707/3; 707/10; 707/100; 370/254

(58) Field of Classification Search ................. 709/220, 709/224, 238, 245, 248, 249, 252; 707/10, 707/3, 100; 705/7; 370/254
See application file for complete search history.

(56) References Cited

U.S. PATENT DOCUMENTS 5,694,547 A 12/1997 Subramanian et al.

(Continued)

FOREIGN PATENT DOCUMENTS

WO WO 98/18306 5/1998

OTHER PUBLICATIONS

G.A. Halse, G. Wells, and A. Terzoli, "XML to Facilitate Management of Mutli-Vendor Netowkrs", South African Telecommunications Networks and Application Conference, Online, Sep. 2, 2001, pp. 1-6, XP002247410.*

(Continued)

* cited by examiner

*Primary Examiner*—Philip Tran
*Assistant Examiner*—Farzana Huq

(57) ABSTRACT

The invention relates to a system and method called autotopology of a network or advertising based network management which enables the analysis and automatic graphical and hierarchical representation of any hierarchical or flat network topology, especially a switched Ethernet (SE). The autotopology can be used for self-configured networks (for example by using zeroconf) and for any otherwise configured networks, especially using DHCP or manually configured networks. The use of zeroconf is called autoconfiguration. Autoconfiguration and autotopology enable a comfortable and safe administration of a network. Administration of a self-configured network using the autotopology data proceeds in a separate and low-priority sub-network (link local) so that the productive operation of the network remains undisturbed. The topology of the network is used as a clear possibility of administering a network. Administration of the network is possible immediately after determination of the topology.

16 Claims, 2 Drawing Sheets

7
8
9
10a
10b
11
12
13
14
15
16

U.S. PATENT DOCUMENTS

| | | | | |
|---|---|---|---|---|
| 5,889,520 | A * | 3/1999 | Glaser | 715/853 |
| 5,926,463 | A | 7/1999 | Ahearn et al. | |
| 5,940,396 | A * | 8/1999 | Rochberger | 370/408 |
| 5,948,055 | A | 9/1999 | Pulsipher et al. | |
| 6,052,716 | A * | 4/2000 | Gibson | 709/217 |
| 6,067,093 | A * | 5/2000 | Grau et al. | 345/440 |
| 6,665,713 | B1 * | 12/2003 | Hada et al. | 709/220 |
| 6,970,919 | B1 * | 11/2005 | Doi et al. | 709/220 |
| 7,000,029 | B2 * | 2/2006 | Marian et al. | 709/245 |
| 7,082,464 | B2 * | 7/2006 | Hasan et al. | 709/223 |
| 7,167,821 | B2 * | 1/2007 | Hardwick et al. | 703/22 |
| 7,185,072 | B2 * | 2/2007 | Hada et al. | 709/220 |
| 2001/0033550 | A1 * | 10/2001 | Banwell et al. | 370/254 |
| 2002/0158897 | A1 * | 10/2002 | Besaw et al. | 345/734 |
| 2003/0069960 | A1 * | 4/2003 | Symons et al. | 709/224 |
| 2003/0115303 | A1 * | 6/2003 | Marian et al. | 709/222 |
| 2004/0059812 | A1 * | 3/2004 | Assa | 709/224 |

OTHER PUBLICATIONS

G.A. Halse, G. Wells and A. Terzoli, “XML to Facilitate Management of Multi-Vendor Networks”, South African Telecommunications Networks and Application Conference, Online, Sep. 2, 2001, pp. 1-6, XP002247410.

James Won-Ki Hong, Ji-Young Kong, Tae-Hyoung Yun and Jong-Seo Kim, “Web-Based Intranet Services and Network Management”, IEEE Communications Magazine, IEEE Service Center, Piscataway, NJ, USA, vol. 35, No. 10, Oct. 1, 1997, pp. 100-110, XP000723981.

SYSTEM AND METHOD FOR ANALYZING A NETWORK AND/OR GENERATING THE TOPOLOGY OF A NETWORK

CROSS REFERENCE TO RELATED APPLICATIONS

This application is the U.S. National Stage of International Application No. PCT/DE03/00199, filed Jan. 24, 2003 and claims the benefit thereof. The International Application claims the benefits of German application No. 10204826.6 filed Feb. 6, 2002, both of the applications are incorporated by reference herein in their entirety.

FIELD OF INVENTION

The invention relates to a system and method for analyzing a network and/or generating the topology of a network.

BACKGROUND OF INVENTION

With networks, the elements in the network generally have a unique network address for the purpose of exchanging data, by means of which it is possible to exchange data selectively. This situation enables the elements in the network, for example switches, computers, etc., to make themselves known by sending their network address to all the other elements in the network. Until now it has only been possible to determine the topology of such a network manually, i.e. by a person and/or by calling on the assistance of very time-consuming iterative methods.

SUMMARY OF INVENTION

The object of the present invention is to simplify and automate the analysis and representation of the topology of any arbitrary network for the exchange of data, so that the need for human assistance can be obviated.

This object is achieved by a method for analyzing and representing the topology of a network for the exchange of data, consisting of at least two elements, to each of which is assigned at least one network address, whereby each element in the network is automatically registered, its hierarchical position in the network is determined by reference to the network address of the element, and from this the structure of the network is generated and saved.

This object is achieved by a system for the analysis and representation of the topology of a network for the exchange of data, consisting of at least two elements, to each of which is assigned at least one network address, whereby the system automatically registers each element in the network, determines its hierarchical position in the network by reference to the network address of the element, and from this generates and saves the structure of the network.

A particularly advantageous embodiment of the invention is characterized by the fact that the topology of the network is held as data in the format of a markup language, and the graphical representation of the network topology is generated by reference to this data. Saving the data in the format of a markup language enables the data thus stored to be made available without problem to other systems for the purposes of representation and/or further processing, in particular over or by means of an intranet or the internet, as applicable. In doing this, it is advantageous to use as the markup language the Extended Markup Language (XML), Hypertext Markup Language (HTML) or related dialects. Here, an exceptionally advantageous form of embodiment is to save the topology of the network as a file in XML format because, when this markup language is used, it is possible to effect a particularly rapid representation, and hence time-saving.

It is especially advantageous if the graphical representation of the network's topology is in the form of a hierarchical tree structure. A graphical representation permits a rapid overview of the topology of a network, and hence its structure, whereby the hierarchical tree structure gives a simplified, and hence improved, overview of the links between individual network elements and/or their interdependencies.

A further advantageous form of embodiment of the invention is characterized by the fact that the topology of the network is constantly being checked, compared to the previous current state, and each time there is a change to the topology the current topology of the network is automatically generated and stored as a file. This enables continuous online checking of the network topology, which can if required be called up at any time and displayed graphically. A particular advantage which this brings is that the up-to-date details of the topology of a network are continuously available, but this can be effected in the background, i.e. without a display screen. Only when it becomes necessary need a computer with a display screen be connected into the network, to call up and display on the screen the continuously updated data about the topology of the network, for example for maintenance purposes.

A further particularly advantageous form of embodiment of the invention is characterized by the fact that the structure of the network is saved as a file and that the file, containing the current data for the relevant topology of the network can be called up and/or the topology of the network can be displayed graphically. In addition, it is particularly advantageous if the graphical representation of the topology of the network is used for the administration and/or the configuration of the elements in the network and/or the network itself. This makes it possible to administer and/or configure other elements or the network itself from any point in the network. This makes it possible to intervene immediately at any point in the network, regardless of geographical location, when current situations arise, for example critical ones, because the current topology of the network is available at any point in time.

A further advantageous form of embodiment of the invention is characterized by the fact that it is possible to generate automatically the topology of two or more independent subnetworks which are linked to each other by at least one element, and to display it in a graphical representation, in which network islands form the first level of the hierarchical structure. This also makes it possible to automatically register several networks, so-called subnetworks, even if they are linked together only by an individual computer or element, as applicable, and thus enables the topology of several subnetworks to be automatically shown in a single graphical representation of the topology. The advantage of this form of embodiment is that it provides an overview of several subnetworks in a single representation, so that it is not necessary to swap separately into each of the subnetworks concerned.

An exceptionally advantageous form of embodiment of the invention is characterized by the fact that each element in the network is characterized in each case by at least one hyperlink within the data items which specify the topology of the network, and its interaction with a network element is effected by means of this hyperlink, whereby the interaction using the hyperlink can be performed from within the graphical representation of the topology. It is furthermore of particular advantage if the interaction with a network element is effected by means of hyperlinks over the internet and/or intranet. The advantage of this is that each network element can be reached by an internet connection, i.e. each element is addressed and symbolized by an internet or intranet page, using the appropriate internet address, a so-called URL address. A click on this hyperlink then makes available for each element one or more internet or web pages, on which the appropriate configuration or administration tasks can be completed.

A form of embodiment of the invention which is of further advantage is characterized by the fact that it is possible to show the individual elements of the network in different colors in the graphical representation of the topology of the network, where the color of the representation indicates the status of the element concerned. Here, at least three different statuses are possible for each element, in particular green for "link to element is in order", red for "link to element is faulty" and yellow for "diagnosis in progress for the element's link". All other possible color combinations are, of course, conceivable and possible. This not only gives one an overview of the current topology of the network but, in addition, it makes possible a diagnosis of the individual elements of the network and hence an exceptionally rapid and cost-effective analysis can also be performed, for example in the event of a fault. Using the hyperlink access to the configuration or administration data concerned, it is also possible to carry out maintenance, in particular remote maintenance, for a possibly-faulty link to the element.

A further advantageous form of embodiment of the invention is characterized by the fact that the topology of any arbitrary switched Ethernet can be automatically analyzed and represented. This is of particular advantage because a switched Ethernet is very often used, in particular, in the case of industrial plants, production machinery, automated facilities, so that high costs are incurred for checking, analysis and maintenance activities, which are substantially reduced by the invention. This applies also to the use in manufacturing and/or process automation systems of the method disclosed, which also leads to substantial cost reductions.

The invention is described and explained in more detail below by reference to the exemplary embodiments shown the figures.

BRIEF DESCRIPTION OF THE DRAWINGS

These show.

DETAILED DESCRIPTION OF INVENTION

Figure 1:
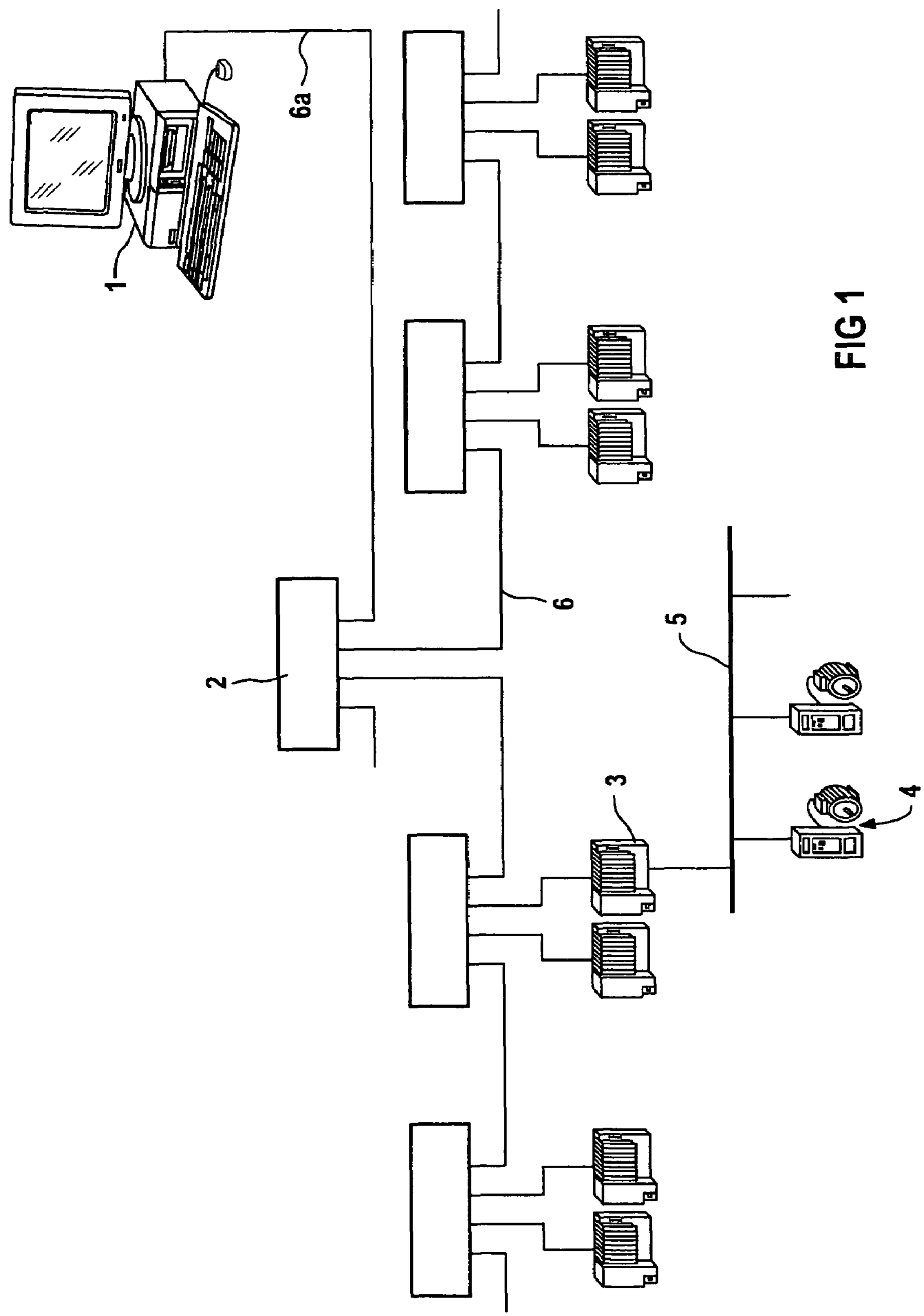
FIG. 1 a schematic representation of a first form of embodiment for a network, and FIG. 2 a schematic diagram of the advertising of a new element in a network.

The schematic representation as in FIG. 1 shows a first form of embodiment for a network, for example a switched Ethernet with several elements. Further examples of such networks are: Fieldbus, Profibus, Ethernet, Fast Ethernet, Industrial Ethernet or Fire-Wire, but also clocked data networks such as the Isochronous Real-time Ethernet, for example, and combinations of them. The networks used can either be equipped or not with real-time characteristics, such as clock synchronization and equidistance. In FIG. 1, for example, several coupling elements, also referred to as switches, of which for the sake of presentational clarity only Switch 2 is shown, can be linked with each other over data lines, of which for the sake of presentational clarity only the data lines 6 and 6*a* are shown. Thus such data lines are used to connect the switches to nodes, for example industrial computers, PCs or other computers, etc., of which for the sake of clarity only node 3 is shown. The nodes can set up connections over the data lines, exchange data and clear the connections again in a controlled manner. In addition, each node must be identifiable. Furthermore, the nodes can be connected to other elements, for example a programmable logic computer (PLC) and its terminal devices 4, via other networks, for example the Profibus network 5. Examples of such elements are central programmable controllers, programming, configuration or operating devices, peripheral devices such as input/output modules, drives, actuators, sensors, programmable logic controllers (PLCs) or other control units, computers or machines which exchange electronic data with other machines, in particular which process data from other machines. Here, the term control unit is to be interpreted as any type of closed or open loop controller.

In the present exemplary embodiment, one computer 1, which is particularly singled out and which is referred to below as the Manager, is linked via the data line 6*a* to the Switch 2, which is part of the network already described. The Manager 1 contains the functionality to permit the analysis and automatic creation and hierarchical representation of any arbitrary network topology, hierarchical or flat, in particular for a "switched" Ethernet (SE) and in particular also for the network shown schematically in FIG. 1. This procedure, or functionality of this type, as applicable, is referred to below as autotopology.

In order to arrive at such functionality, two "discovery" methods—SNMP top-down and SSDP bottom-up—have been combined and improved. One then also refers to "advertising based network management"

In any arbitrary network, each node in the network has two different addresses, for example in accordance with the ZEROCONF standard or ZEROCONF specification as applicable, so-called IP addresses where IP means Internet Protocol, of which one IP address is used for the ongoing operation of the node concerned within the network. This is therefore also referred to as the "productive" IP address, because it can be known to the other network elements, and therefore can be queried or addressed during ongoing operation. This address is therefore "routable". On the other hand the second, secondary, address is not "routable" for the other network elements, or not for all of the network elements. Such an address is also referred to as, for example, a "local link" IP address (LL-IP address).

The "productive" IP address may be allocated to the network elements either automatically by a network protocol, in particular an internet protocol such as for example DHCP (Dynamic Host Configuration Protocol), or may also be allocated manually. This "productive" IP address is linked to the hardware address concerned for the network card in the computer concerned, also called the MAC address, which is unique around the world. The nodes may themselves autonomously assign the secondary LL-IP addresses, but the uniqueness of the secondary LL-IP addresses must remain guaranteed. They can also be assigned manually. This means that, for example, when two or more subnetworks are connected together a "reassignment" may be necessary, i.e. a reassignment of the secondary LL-IP addresses, if the secondary LL-IP addresses are duplicated. The secondary LL-IP addresses give nodes the ability to latch in as new elements into a network which is running "productively", such as that shown by way of example in FIG. 1, and by the use of their secondary "local-link" IP addresses to register and declare themselves, without disrupting the productive operation of the network, which is being handled using the "productive" IP addresses of the network elements.

Figure 2:
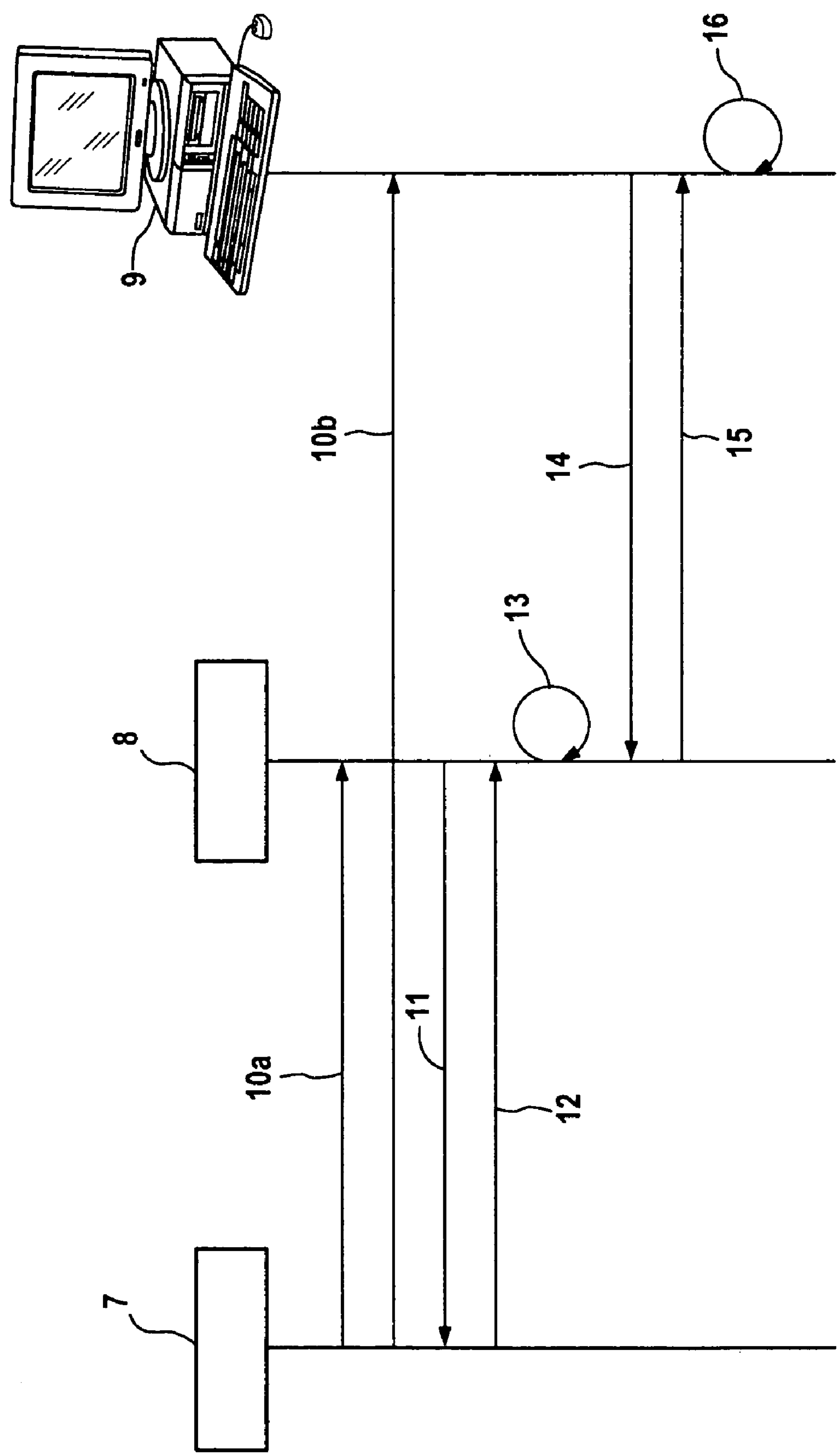

In FIG. 2, a new network element, the node 7, announces its connection to the network by sending out so-called IP multicast telegrams 10*a*, 10*b* to all the available network elements, in this case the Switch 8 and the Manager 9; this is also referred to as an "advertisement" of the network node. For example, if the Simple Service Discovery Protocol (SSDP) is being used, it is possible to find all the switches which are in the network, in particular Switch 8 and the Manager 9, by certain commands, for example "ssdp:notify" or "ssdp:m-search". This procedure is also referred to as "discovery". All the switches, in particular Switch 8 and/or in addition the Manager 9, are informed of the secondary "local link" IP address in this way. If other protocols are used, appropriate commands valid under these protocols will be used. Obviously, the same mechanism can be used in an analogous way in deregistering a network element, for example the node 7, from the network. Using the secondary "local link" IP address, the switches, in particular Switch 8, can query the MAC addresses concerned for new network elements belonging to the switches, for example for node 7 by means of a query 11 about the MAC address of node 7, and the MAC address sent back as a reply 12 can be used to make entries 13 for node 7 in tables, so-called "learning tables".

Each switch in the network, in particular also Switch 8, maintains its own "learning tables" in which are indexed the MAC addresses and the corresponding "productive" IP addresses of each of the network elements, for example node 7, connected to the individual ports of the switch concerned.

Through "discovery" procedure, the Manager 9 knows the secondary "local link" IP addresses of all the network elements, in particular of node 7, and each switch, in particular Switch 8, together with the MAC addresses and the "productive" IP addresses of all the nodes which are connected to the ports on the switch concerned, in particular on node 7.

The Manager 9 determines the MAC addresses of all the network components, in particular of node 7, which have been "learned" at a particular port on a switch, in particular Switch 8, i.e. which have been indexed in the appropriate "Learning Tables", by means of appropriate commands, for example if the Simple Network Management Protocol (SNMP) is being used by an SNMP GET query 14 to the switch SNMP agent, Switch 8. This latter supplies the desired MAC and/or "productive" IP addresses for the network elements which are connected to the corresponding port, in particular the addresses of node 7, as an SNMP Get Response 15 to the SNMP GET query 14.

The Manager 9 then compares the "local link" IP addresses, determined for example from the "ssdp:notify" telegrams, in particular for node 7, with the MAC addresses obtained for example from the SNMP Get Response 15, and from the comparison of these items of data automatically generates the topology or hierarchy, as applicable, of the network, which is filed and saved in the form of a hierarchical tree in a file 16. This operation is referred to as autotopology. In doing so, it is advantageous if the topology of the network is specified in the markup language XML, but other markup languages which are commonly used on the internet, in particular HTML, XHTML etc., are also possible and conceivable. The graphical representation of the topology of the network under consideration is produced (for example using a user-defined OLE control element, that is an OCX file) on the basis of this generated file 16, for example in the markup language XML. This makes it possible for any browser with the capability to interpret the markup language, for example XML, to display the topology of the network. It is advantageous if the topology is constructed as a hierarchical tree structure, which will make it possible to represent unconnected networks, because in such a representation network islands form the first level of the XML tree.

The procedure described for the initial registration of a network element, more specifically node 7, can of course also be used in the opposite situation where the Manager 9, or more specifically the autotopology functionality, is connected to a network which already exists.

The manager, for example Manager 9, continuously checks the topology of the network, compares it against the previous current state, and for each change in the topology, for example the registration of a new network element or deregistration of an old one, automatically generates the current topology of the network and files it in a file. This enables continuous online checking of the topology of the network, which can be called up and displayed graphically at any time when it is required. A particular advantage arising from this is that the current topology of a network is continuously available as a file, but this can be effected in the background, i.e. without the need for a display screen. Not until it is required, for example for maintenance activities, need a computer be connected into the network and the continuously updated data about the topology of the network be called up and displayed graphically on the screen.

A first advantageous form of embodiment is the identification or symbolization of the elements of the network, in each case by at least one hyperlink, for example an internet-compatible URL and/or WWW address, etc., within the data which specifies the topology of the network, for example the XML data. This makes it possible to interact with each network element using the hyperlink which symbolizes the element, whereby the interaction using the hyperlink can be effected, in particular, from within the graphical representation of the network topology. It is, furthermore, particularly advantageous that, when internet or intranet addresses are used as the hyperlinks, the interaction with a network element is effected by means of a hyperlink over the internet and/or the intranet. The advantage of this is that each network element can be reached via an internet connection, using a hyperlink, i.e. each element is addressed and symbolized by an internet or intranet page using respectively the corresponding internet or intranet address, a so-called URL and/or WWW address. A click on this hyperlink from within the graphical representation of the topology makes available for each element one or more internet or web pages, as applicable, on which the appropriate configuration or administration tasks can be completed, i.e. the graphical representation of the network's topology can be used for the administration and/or configuration of the elements in the network and/or the network itself. This makes it possible to administer and/or configure other elements or the network itself from any arbitrary places in the network, so that it possible to intervene immediately at any arbitrary place in the network, regardless of geographical location, when relevant situations arise, for example critical ones, because the current topology of the network is available at any point in time.

A further very advantageous form of embodiment is characterized by the fact that it is possible to show the individual elements of the network in different colors in the graphical representation of the topology of the network, where the color of the representation indicates the status of the element concerned. Here, at least three different statuses are possible for each element, in particular green for "link to element is in order", red for "link to element is faulty" and yellow for "diagnosis in progress for the element's link". All other possible color combinations are, of course, equally conceivable and possible. This not only gives one an overview of the current topology of the network but, in addition, it enables diagnosis of the individual elements of the network and hence an exceptionally rapid and cost-effective analysis can also be performed, for example in the event of a fault. Using the hyperlink access to the configuration or administration data concerned, it is also possible to carry out maintenance, in particular remote maintenance, for a possibly-faulty link to the element.

The system and method of network autotopology, also referred to as "Advertising based Network Management" enables an analysis and automatic graphical and hierarchical representation to be produced for any arbitrary network topology, hierarchical or flat, in particular for a "switched" Ethernet (SE).

Here, autotopology can be used both for networks which are self-configured (for example by the use of ZEROCONF) and also for networks configured in any alternative way, for example using DHCP, or manually configured networks. The use of ZEROCONF is referred to as autoconfiguration.

Autoconfiguration and autotopology make user-friendly and secure administration possible for a network. The administration of a self-configured network by reference to the autotopology data is effected in a separate and lower-priority subnetwork (local link subnetwork) so that the productive operation of the network is unaffected.

Immediately after the determination of its topology, the network can be administered.

Interaction with the network components which are to be administered is effected by a URL, i.e. for example a hyperlink to an internet address, within the data which specifies the network topology.

Legacy systems, that is systems which have nor yet implemented the present technology, are added in manually.

Autotopology is permanently "ONLINE". The URLs for the network components which are to be administered are, for example in an XML browser, shown on a colored background. A click on the URL for a network component accesses the web page which the device offers for administrative purposes.

The invention disclosed can be used with advantage for and/or during the monitoring, closed and open loop control of, and in, packing machinery, presses, plastic injection molding machines, textile machinery, printing machinery, machine tools, robots, handling systems, woodworking machinery, glass processing machinery, ceramic processing machinery and lifting equipment.

The invention claimed is:

1. A method for analyzing a network and generating the topology of said network for exchanging electronic data, the method comprising:

providing at least two elements of the network, wherein each of the elements of the network is assigned at least one network address;

automatically registering each element of the network;

determining the hierarchical position of an element within the network by reference to the network address of the element;

generating data indicative of the topology of the network, said data comprising a markup language, wherein each respective element in the network is uniquely assigned a respective hyperlink in the data which indicates the topology of the network, and wherein a user's interaction with each respective network element is effected by the assigned hyperlink;

processing said data to generate a graphical representation of the network's topology, wherein said graphical representation is in the form of a hierarchical tree structure, wherein the user's interaction with each network element using the hyperlink is effected from within a graphical representation of the topology of the network, wherein the elements in the network are shown in different colors in a graphical representation of the topology of the network, and wherein the color of the representation is selected to indicate a present status of each respective element, wherein for each respective element three different statuses are available, wherein a first status of the respective element consists of an indication that a link to the respective element is available, wherein a second status consists of an indication that a link to the respective element is faulty, and wherein a third status consists of an indication that a link to the respective element is undergoing diagnostics;

continuously monitoring a present status of the topology of the network;

comparing the present status of the topology of the network relative to a previous status of the topology of the network;

based on a result of said comparing, determining at least one change in the present status of the topology of the network relative to the previous status of the topology of the network; and upon determining an occurrence of at least one change in the present status of the topology of the network, updating the graphical representation of the topology of the network to include said at least one change, including a color change corresponding to a change in the status of each respective element.

2. The method in accordance with claim 1, wherein the markup language is Extended Markup Language (XML), Hypertext Markup Language (HTML) or a related dialect.

3. The method in accordance with claim 1, wherein the structure of the network is saved as a file, and wherein the file which comprises the relevant current data for the topology of the network can be called up from arty arbitrary element in the network and the topology of the network can be shown in graphical form.

4. The method in accordance with claim 1, wherein a graphical representation of the topology of the network is used for administering and/or configuring the elements of the network and/or the network itself

5. The method in accordance with claim 1, wherein the topology of two or more independent subnetworks, each of which is linked to the others by at least one element, is automatically generated and can be represented graphically in a display.

6. The method in accordance with claim 1, wherein an interaction with a network element is performed via internet and/or intranet by a hyperlink.

7. The method in accordance with claim 1, wherein the topology of any arbitrary switched Ethernet is automatically analyzed and represented.

8. The method in accordance with claim 1, wherein the method is used in a manufacturing system and a process automation system.

9. The method in accordance with claim 1, further comprising: saving the structure of the network.

10. A system for the analysis of a network and the generation of the topology of said network for the exchange of electronic data, the network having at least two elements, each of which is assigned at least one network address, the system comprising:

a mechanism for automatically registering each element in the network, and for determining its hierarchical position within the network by reference to the element's network address;

a mechanism for generating the topology of the network as data in the format of a markup language;

a mechanism for processing said data to generate a graphical representation of the topology of the network;

a mechanism for representing the topology of the network in the form of a hierarchical tree structure;

a mechanism to uniquely characterize each respective element of the network by a respective hyperlink in said data;

a mechanism to allow a user's interaction with a network element to be effected by the respective hyperlink, wherein the interaction using the hyperlink is carried out from within a graphical representation of the topology of the network;

a mechanism for showing the elements in the network in different colors in a graphical representation of the topology of the network, wherein the color of the representation indicates the status of the element concerned, wherein the elements in the network are shown in different colors in a graphical representation of the topology of the network, and wherein the color of the representation is selected to indicate a present status of each respective element, wherein for each respective element three different statuses are available, wherein a first status of the respective element consists of an indication that a link to the respective element is available, wherein a second status consists of an indication that a link to the respective element is faulty, and wherein a third status consists of an indication that a link to the respective element is undergoing diagnostics;

a mechanism for continuously checking the topology of the network, for comparing it with the previous present state and, for each change in the topology, automatically generating and saving the present topology of the network; and a mechanism for updating the graphical representation of the topology of the network to include each change in the topology of the network, including a color change corresponding to a change in the status of each respective element.

11. The system in accordance with claim 10, wherein the markup language used are Extended Markup Language (XML), the Hypertext Markup Language (HTML) or a related dialects.

12. The system in accordance with claim 10, further comprising:

a mechanism for saving the structure of the network as a file, and that the file which comprises the relevant current data for the topology of the network can be called up from any arbitrary element in the network and the topology of the network can be shown in graphical form.

13. The system in accordance with claim 10, further comprising:

a mechanism for using a graphical representation of the topology of the network for the administration and configuration of the elements of the network and/or the network itself.

14. The system in accordance with claim 10, further comprising:

a mechanism for automatically generating the topology of two or more independent subnetworks, each of which is linked to the others by at least one element, and for graphically representing the topology.

15. The system in accordance with claim 10, further comprising:

a mechanism for carrying out interactions with a network element using a hyperlink over the internet and/or intranet.

16. The system in accordance with claim 10, further comprising:

a mechanism for automatically analyzing and representing the topology of any arbitrary switched Ethernet.

* * * * *